June 5, 1956 G. R. PATTERSON ET AL 2,748,725
SEMI-AUTOMATIC PIE MACHINE
Filed Jan. 14, 1953 5 Sheets-Sheet 1

G. R. Patterson
J. R. Matthews
INVENTORS

BY C. A. Snow & Co.
ATTORNEYS.

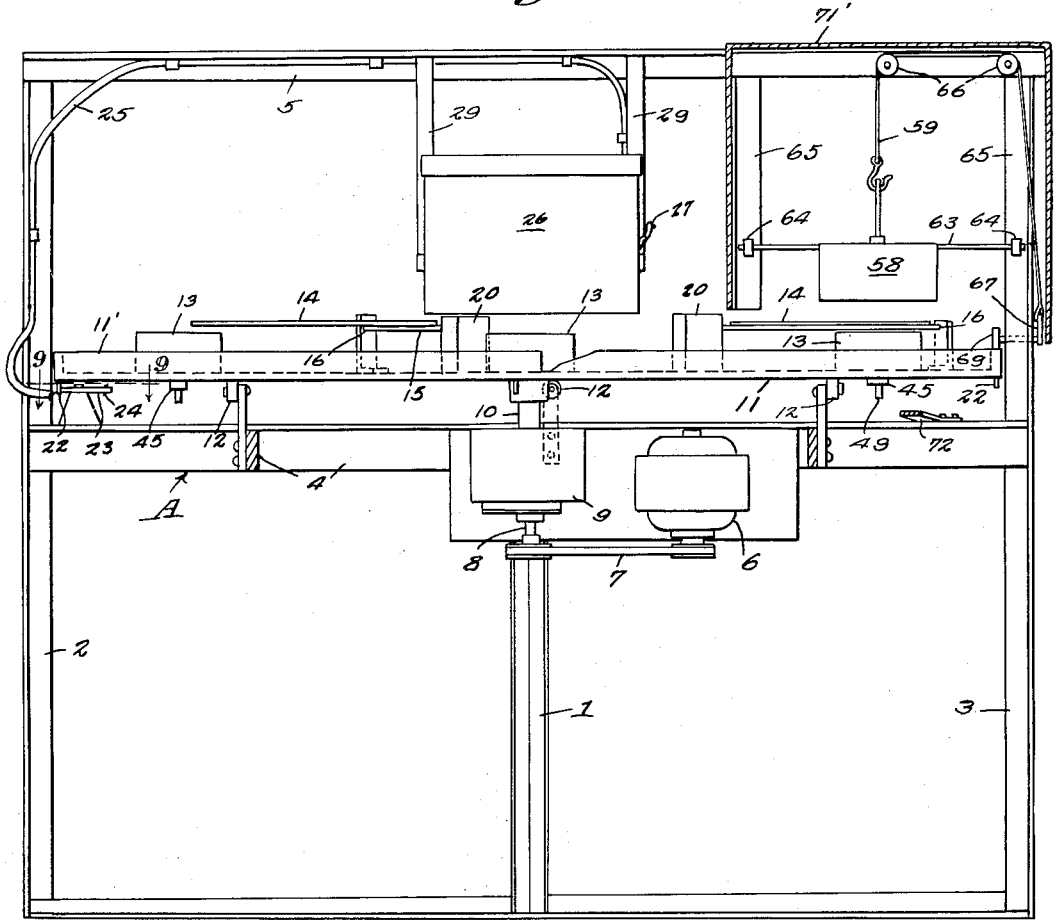
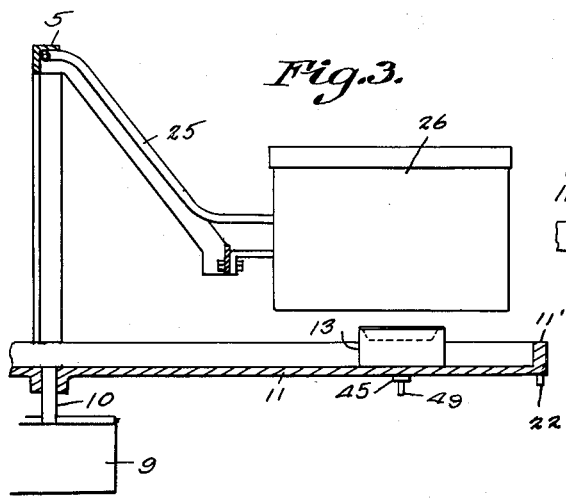
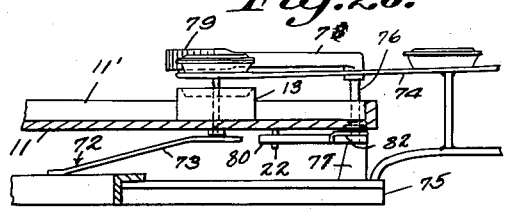

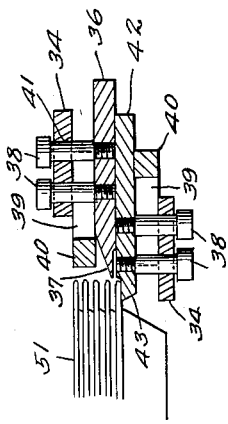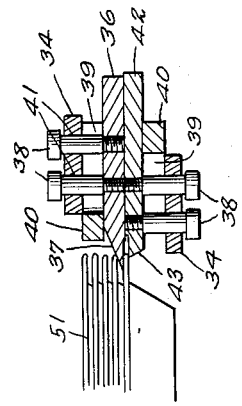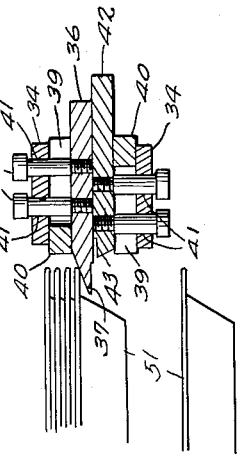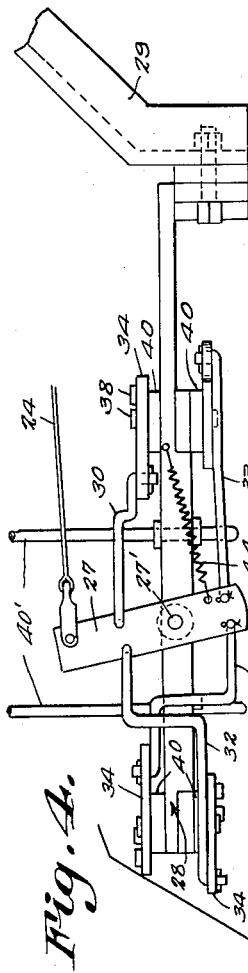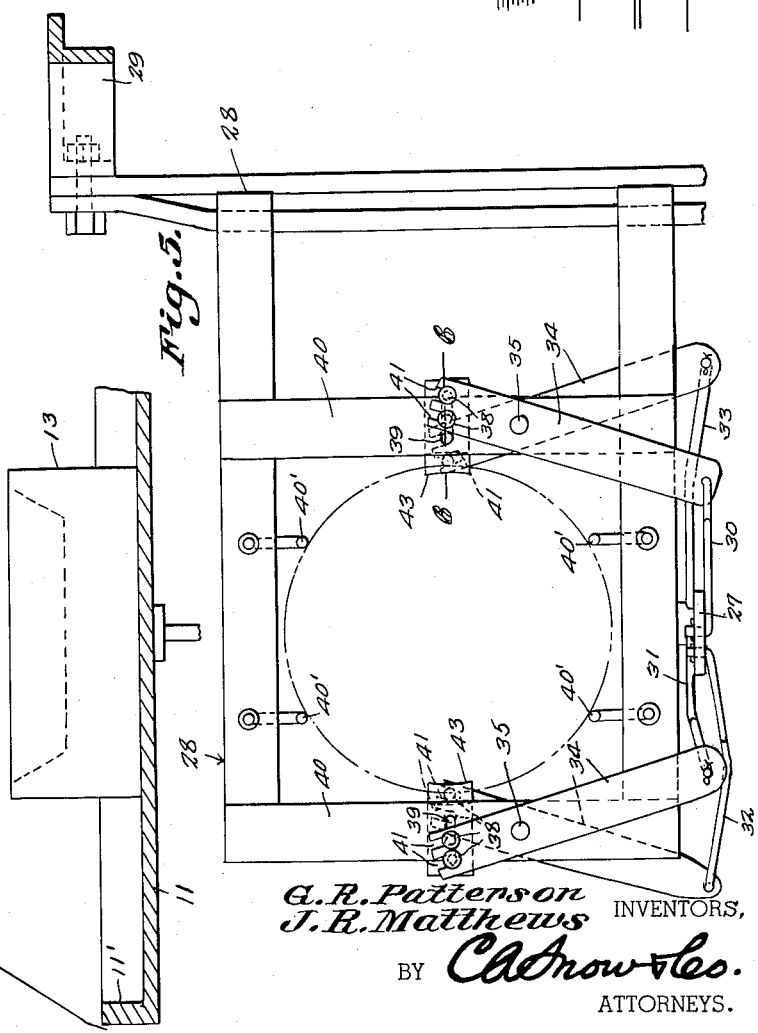

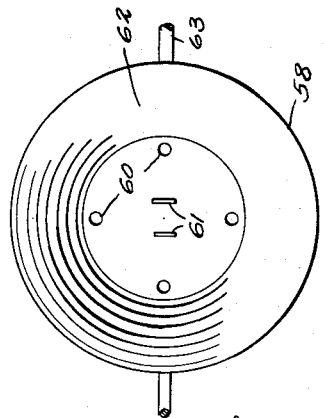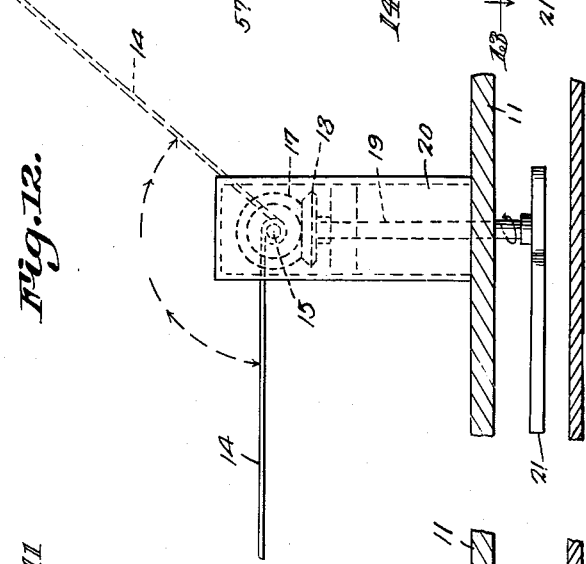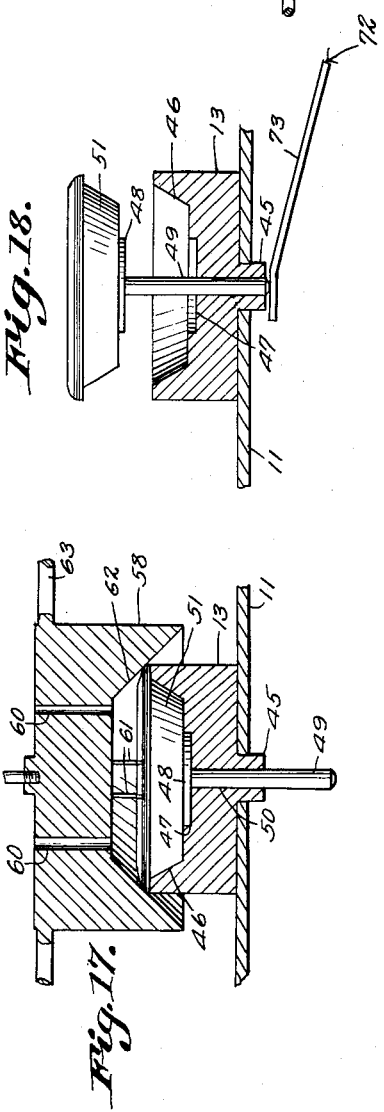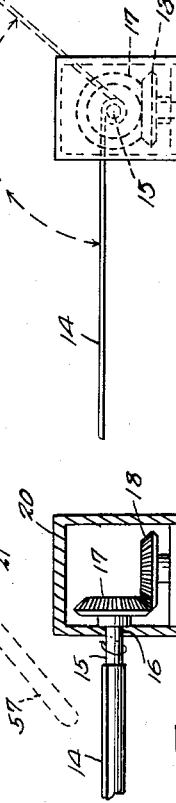
G. R. Patterson
J. R. Matthews
INVENTORS, June 5, 1956     G. R. PATTERSON ET AL     2,748,725
SEMI-AUTOMATIC PIE MACHINE
Filed Jan. 14, 1953     5 Sheets-Sheet 5
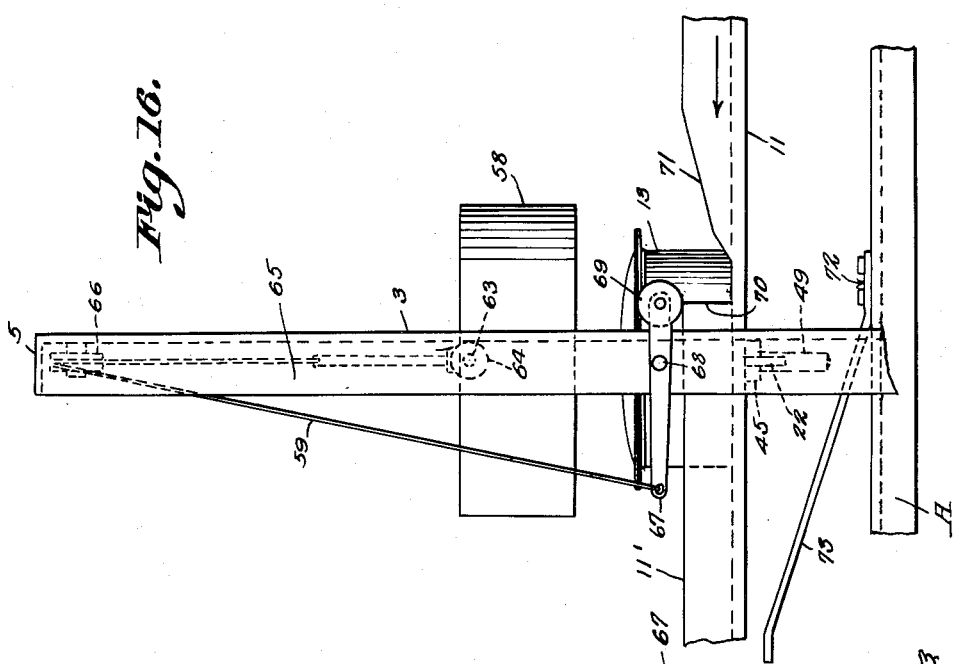
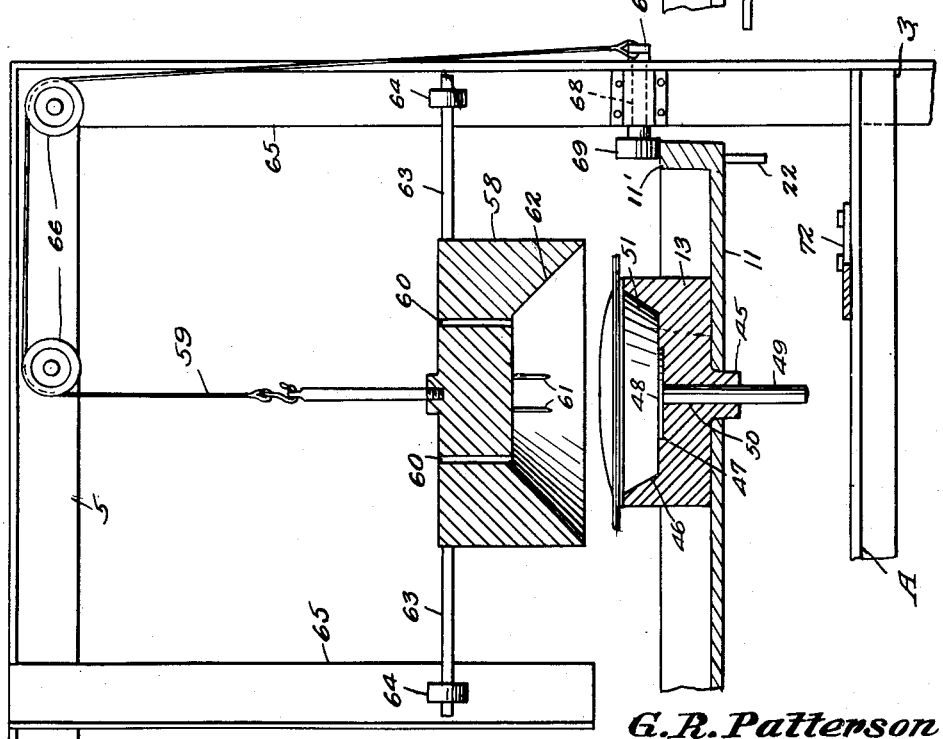
G. R. Patterson
J. R. Matthews
INVENTORS
BY C. A. Snow & Co.
ATTORNEYS.

United States Patent Office 2,748,725
Patented June 5, 1956

2,748,725

SEMI-AUTOMATIC PIE MACHINE

Glenn R. Patterson, Biltmore, and John R. Matthews, Asheville, N. C.

Application January 14, 1953, Serial No. 331,252

4 Claims. (Cl. 107—1)

This invention relates to a machine for the automatic assembly of the constituent parts used in the manufacture of covered and filled pies.

One of the objects of the invention is the provision of a device for delivering the pie pan in position to have the bottom layer of dough and pie filling placed therein.

Another object is in the novel means of placing the covering or top layer of dough on the filled pie pan.

Another object is in the provision of a device for trimming and sealing the two layers of dough, this operation being performed without pause in the continuous motion of the machine.

Still another object is the provision for removing the finished product from the machine for further processing.

With these and other objects in view as will appear as the description proceeds the invention resides in the novel construction and arrangement of parts hereinafter pointed out, it being understood that changes may be made within the scope of what is claimed without departing from the spirit of the invention or sacrificing any of the advantages thereof.

In the drawing:

Fig. 2 is a transverse sectional view taken on line 2—2 of Fig. 1.

Fig. 3 is a view in sectional elevation the same taken approximately on line 3—3 of Fig. 1.

Fig. 4 is a view in elevation of the pie pan delivery device.

Fig. 5 is a plan view of the structure shown in Fig. 4.

Fig. 6 is a sectional view of the side of the feeding mechanism taken on line 6—6 of Fig. 5, the same showing this mechanism in position to support a stack of pie pans.

Fig. 7 is a view similar to Fig. 6 showing the parts in position immediately preceding release of a pan.

Fig. 8 is a view following the action of Fig. 7 in which a pan has been released and the stack held in position for return of the device to its first position shown in Fig. 6.

Fig. 10 is a fragmentary view in section of a portion of the device for placing the upper crust dough on the filled pie pan.

Fig. 11 is a sectional view on line 11—11 of Fig. 10.

Fig. 12 is a view partly in section and partly in elevation of the structure shown in Figs. 10 and 11 with a dotted line position of the dough carrying platform.

Fig. 13 is a sectional view taken on line 13—13 of Fig. 14 showing the action of the trip lever connected to the mechanism shown in Figs. 10, 11 and 12.

Fig. 14 is a sectional view taken on line 14—14 of Fig. 13.

Fig. 15 is a view partly in section and partly in elevation of the pie trimming device, the cover for this device having been omitted.

Fig. 16 is a view in side elevation of the structure shown in Fig. 15.

Fig. 17 is a sectional view of the dough trimming device.

Fig. 18 is a sectional view of the pan holding die showing the pie and pan elevated to a position from which to be removed from the machine.

Fig. 19 is a bottom plan view of the upper trimming die.

Fig. 20 is a sectional view taken on line 20—20 of Fig. 1 showing the pie removing mechanism.

Figure 1:
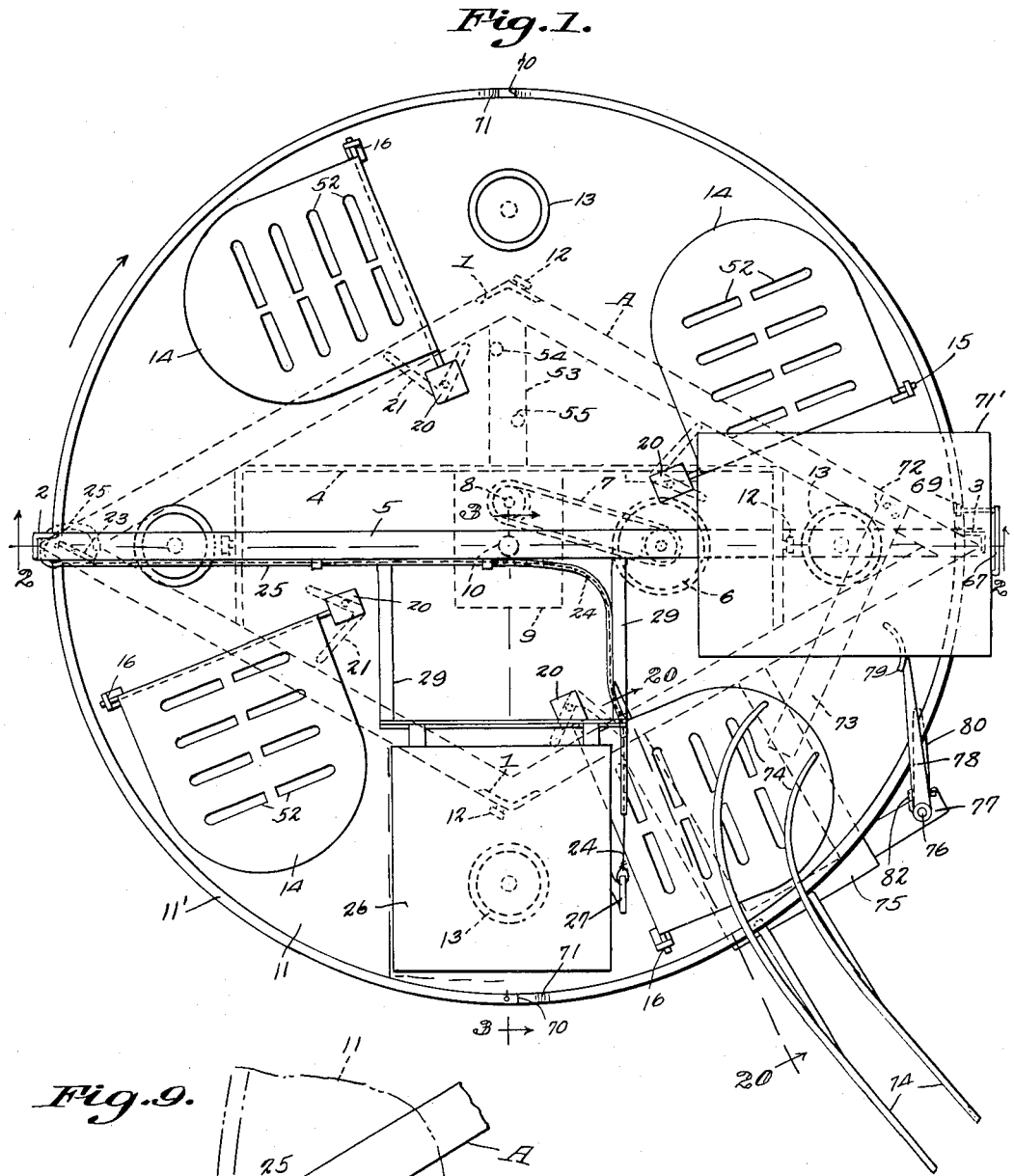
Fig. 1 is a top plan view of the machine with all parts in a normal starting position.

Referring to the drawings by characters of reference, the letter A represents a suitable frame comprising oppositely disposed relatively short posts 1 and longer posts 2 and 3. A supplemental frame 4 is welded or otherwise secured to the frame A. A cross beam 5 connects the tops of the posts 2 and 3. The structure thus far described constitutes the support for the stationary elements of the machine as well as a support for the rotary table together with the parts carried by the rotary table.

A motor 6 secured to the frame 4 is connected through a belt 7 to the drive shaft 8 of a reduction gearing located in a box 9, the take off shaft 10 thereof has mounted thereon the rotary table 11 having an upstanding peripheral flange 11', the weight of the table is carried on rollers 12, mounted on the frame as shown. A plurality of pan holders or male dies 13 are removably mounted on the table 11. In the present showing four pan holders have been shown, equally spaced circumferentially on the table. It will be understood that any desired number of holders may be mounted as described. For each die mounted on the table, there is also mounted a leaf or platform 14 for the reception of a sheet of dough shaped to conform to the shape of the pie to be manufactured. A shaft 15 is secured to the forward edge of the leaf 14, this shaft is mounted at its ends for oscillation in bearings 16, a gear 17 secured to one end of the shaft 15 meshes with a gear 18 mounted on a shaft 19, a cover case 20 protects the gearing above described. The shaft 19 extends through the table 11 and has mounted thereon a bellcrank tappet lever 21, the purpose of which will presently appear.

Referring to Fig. 1, we have shown a machine before the start of its cycle of operation.

Figure 9:
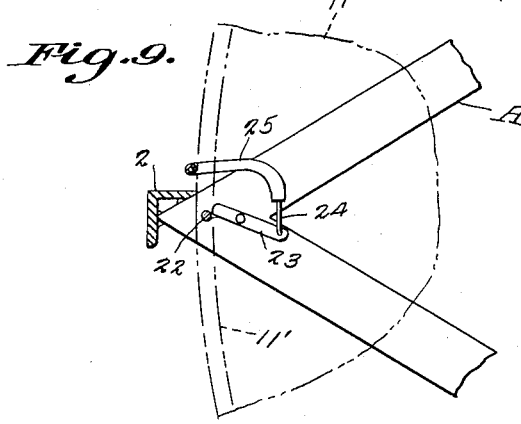
Fig. 9 is a sectional view taken on line 9—9 of Fig. 2.

A pin 22 located adjacent each of the pan holders 13 projects downwardly from the under side of the table and is adapted to engage one end of a lever 23 as shown in Fig. 9. To the opposite ends of the lever 23 is connected a pull wire 24 encased in a flexible sheath 25. This wire and sheath are led up the post 2 and along the beam 5 to a casing 26 which houses the pan dispensing device. The end of the pull wire 24 is attached to a lever 27 pivotally mounted at 27' on the frame 28 of the dispensing device, details and operation of which are shown in Fig. 4 through Fig. 8. The frame indicated generally by the numeral 28 is supported on arms 29 extending from the beam 5.

Links 30, 31, 32 and 33 are pivotally connected to the lever 27 equi-distant from the pivotal point 27' said lever, the links 30 and 31 being connected diametrically opposite said pivot, the links 32 and 33 being likewise connected to the lever, all as shown in Fig. 4. The opposite ends of these links are connected to shift levers 34. These levers are arranged in pairs at opposite sides of the frame and each pair is pivoted at 35 to the frame.

Since the structure, operation and function of these levers and the parts operated thereby is the same at both sides of the device it is therefore thought a description of one set of parts will suffice for a complete understanding of the whole.

A slide block 36 has a beveled end 37 and secured thereto and extending upwardly therefrom is a pair of pins 38, which pins are mounted for right line movement in a transverse slot 39 formed in a longitudinal bar 40 of the frame 28. The lever 34 has elongated slots 41 formed at one end thereof in which the pins 38 are located thus swinging or oscillation movement of the lever is transmitted to the slide in the right line movement necessary for proper operation of the slide.

As stated above the upper slide block 36 has a beveled end 37, whereas a lower slide block 42 is provided with a lip 43 the functions of these parts will appear later in the description.

A spring 44 returns the lever 27 and its attendant parts to initial position after each operation thereof.

Each pan holder 13 has a projection 45 extending from its base which is seated in an opening in the table. Pies of different diameters require a die or plate holder for each size pie. The projection 45 thus enables an operator to change holders and have each size holder correctly positioned on the table. The holder is counter-bored at 46, to the shape of the pan to be used therewith, a second counter-bore 47 has seated therein a table 48, a stem 49 secured to the table 48, is adapted to move upwardly in a bore 50 formed in the holder and its extended projection 45, the purpose of the table 48 and stem 49 will appear later in the direction.

The positions of the lever 23 shown in Fig. 9 correspond to the position taken by the slide blocks 36 and 42 in Fig. 8 to discharge a pan to each holder in time relation with its arrival at the pan dispensing device.

The normal position of the dispensing parts is shown in Fig. 6 in which a stack of pans 51 is shown resting on the lip of the slide 42, as the pin 22 moves the lever 23 to pull the flexible element 24 to the limit of its movement, the lever 27 is rocked on its pivot 27' and through the links 30, 31, 32 and 33 the four levers 34 are moved to insert the pointed end 37 of the slide 36 between the flange of the bottom pan 51 of the stack and the flange of the pan next above, simultaneous with this movement of the slide 36 the lip 43 of the slide 42 is withdrawn from under the flange of the pan resting thereon and said pan is dropped to its position on the pan holder. The spring 44 returning the parts to their starting position shown in Fig. 6. Rods 40' are mounted on the frame 28 and serve to guide the stack of pie pans to the dispensing slides. The table 11 moves in clockwise direction at a predetermined constant speed and as the pan emerges from under the cover 26 an attendant places a layer of dough in the pie pan to form the bottom of the pie. He also places a sheet of dough on the leaf or platform 14 following the lined pan, this sheet of dough to serve as a top crust for the pie. As the table continues to rotate, fruit or other filling is placed in the lined pan, ready for the top crust to be applied.

It will be observed the holders 14 are provided with elongated openings 52 to prevent vacuum action interferring with discharge of the dough from the holder.

Removal of the sheet of dough from the holder 14 to its position on top of the pie is effected as follows. Frame A supports tappet rollers 54 and 55 (Figs. 13 and 14). As the bellcrank 21 moves along the dash line in Fig. 13 the short arm 56 engages the roller 54 thus rotating the shaft 19 and through gears 17, 18 and shaft 15 the platform containing the pie topping is rotated as shown in Fig. 12. It will be noted that due to the position of the roller 54 with relation to the path of forward movement of the bellcrank an accelerated motion is given the platform 14 as the pivotal point of the arm 56 rides nearer to the roller 54. As the platform with the dough thereon reaches a vertical position when viewed as in Fig. 12 the combined forces of momentum and gravity advance the arm and the bell crank lever 21 to approximately the dotted line positions shown in Figs. 12 and 13. Engagement of the arm 57 with the roller 55 terminates movement of the platform 14 in the position shown in dotted lines in Fig. 12. Momentum of the dough heretofore resting on the platform carries the dough forward to fall in position on the filled pie pans. Further movement of the arm 57 in engagement with the roller 55 returns the platform to a vertical position and by gravity it returns to its starting position to receive a pie cover in the next cycle of operation. The filled and covered pie is now ready to be trimmed of excess dough from the circumference of the pie. The structure for performing this operation is illustrated in detail in Figs. 15, 16, 17 and 19.

A female die 58, suspended from a flexible element 59, is provided with vent openings 60 and piercing cutters 61. A truncated cone shaped socket 62 is formed in the die. The inclined surface of which is adapted to shear the excess dough of the upper and lower layers of pie dough and seal them together against the rim of the pie pan and the other member 13 of the die. Guide arms 63 are secured to opposite sides of the die 58, rollers 64 mounted on the arms 63 ride against uprights 65 forming a support for the trimming device. The element 59 is trained over pulleys 66 and connected to one end of a lever 67 pivoted at 68 to the frame 65. A roller 69 mounted at the other end of the lever 67 rides the upper surface of the flange 11'. A step 70, one for each pie holder, is formed in the flange 11' adjacent each holder. Rotation of the table in the direction of the arrow in Figs. 1 and 16, moves the step 70 under the roller 69 and the die 58 is dropped over the pie, the weight of the die severing the dough protruding over the edge of the pie plate. The die 58 is immediately restored to its starting position by reason of the inclined portion 71 of the step. It will here be observed that with the table 11 in constant motion and the die 58 being relatively fixed, a short period of contact between the pie holder and die will exist at each operation of the trimming device, for this reason the guide rollers 64 are free to move forward with the table thus contact between the holder and die, being momentary, results in no damage to the pie. A cover 71' is provided for the trimming device. Means for removal of the completely prepared pie for baking is illustrated in Figs. 18 and 20. A plate 72 secured to the frame A extends forwardly under the path of the lower end of the stem 49 of the platform 48. As the stem 49 passes over the plate 72 an inclined portion 73 thereof raises the stem and platform with a pie resting thereon as shown in Figs. 18 and 20, to a position above the plane of a curved track 74 supported at the side of the machine on a frame 75.

A shaft 76 mounted for movement in a bracket 77 projecting from the support 75 has a lever 78 secured to its upper end, the lever has a hand 79 for wiping the pie from the platform 48 to the track 74. A lever 80 is secured to the lower end of the shaft 76. The lever 80 lies in the path of the pins 22. Thus as each pie is trimmed and moved by the table from under the trimmer, one of the pins 22 engages the lever 80 moving the hand 79 into contact with the pie, removing the same from the platform 48 to the track 74 as seen in Fig. 20. At this point the stem 49 passes off the end of the bar 72 and the platform drops to its position in the die 13. As the arm 78 is moved to discharge the pie a spring 82 is placed under tension to return the arm and lever to its initial position.

In operation the cycle of operation is as follows. With the table in motion as described, a pie plate is deposited on the plate holder, then manually covered with a sheet of pie crust dough.

A second sheet of dough is also placed on the adjacent dough platform. This sheet to form the top crust of the pie. Fruit or pie filling is now placed in the dough lined pan. The dough carrying device is next operated by movement of the gearing connected thereto to place the top crust dough on the pie. As the pie moves through the trimmed device the rim of the pie dough is cut and sealed. Finally the ejecting mechanism comes into play and the pie is moved on its way to the bake oven.

This entire cycle of operations occurring without pause of the machine.

Having thus described the invention what is claimed is:

1. In a device of the class described, a frame, a table mounted for rotation in a horizontal plane on said frame, a plurality of holders on said table in which pie pans are positioned and on which sheets of pie dough are manually placed, for receiving pie filling, a normally horizontal platform pivotally mounted adjacent to each holder, on which a sheet of dough is positioned, said platforms adapted to swing vertically to horizontal positions directly over the pie pans delivering the upper sheet of pie dough positioned thereon, onto said pie pans, and mechanism for normally returning said platforms to horizontal positions laterally of said pan holders.

2. In a device of the class described, a frame, a table mounted for rotation on said frame, a plurality of holders on said table into which pie pans are positioned and onto which sheets of pie dough are manually placed to receive pie filling, a plurality of wide flat platforms pivotally mounted on said table adjacent to said pie pan holders adapted to swing over said pie pan holders, said platforms adapted to receive sheets of pie dough for delivery to said pie pans positioned on the pan holders covering the pie filling and means for returning said platforms to their horizontal positions laterally of said pie pan holders.

3. In a device of the class described, a frame, a circular table mounted for rotation on said frame, a plurality of pie pan holders on said table in which pie pans are positioned for containing pie dough and pie filling, a plurality of wide flat pie dough platforms pivotally mounted on said table at one of their respective edges, adjacent to said pie pan holders, said platforms adapted to swing vertically over said pie pans delivering pie dough in sheets covering the pie filling in said pie pans.

4. In a device of the class described, a stationary frame, a circular table mounted for rotation on said frame, a plurality of pie pan holders on said table, means for selecting pie pans from a stack of pie pans for delivery into said pie pan holders, said pie pans adapted to receive pie dough and pie filling, a plurality of platforms pivotally mounted on said table adjacent to said pie pan holders, for receiving sheets of pie dough, mechanism for swinging said platforms and dough carried thereby to positions directly over pie pans held within the pie pan holders, covering the pie filling within said pie pans, and means for returning said platforms to horizontal positions directly over said table laterally of said pie pan holders.

References Cited in the file of this patent

UNITED STATES PATENTS

| Number | Name | Date |
|---|---|---|
| 748,392 | Manning | Dec. 29, 1903 |
| 778,295 | Williams | Dec. 25, 1904 |
| 821,784 | Colborne | May 29, 1906 |
| 835,756 | Hutchison | Nov. 13, 1906 |
| 1,653,402 | Kaser | Dec. 20, 1927 |
| 1,671,321 | Smith | May 29, 1928 |
| 1,695,511 | Smith | Dec. 18, 1928 |
| 2,280,324 | Tracy | Apr. 21, 1942 |